US011106417B2

(12) United States Patent
Kenjalkar

(10) Patent No.: US 11,106,417 B2
(45) Date of Patent: Aug. 31, 2021

(54) COLLABORATION SYSTEMS WITH MANAGED SCREEN SHARING

(71) Applicant: AirWatch, LLC, Atlanta, GA (US)

(72) Inventor: Avanti Kenjalkar, Atlanta, GA (US)

(73) Assignee: AirWatch, LLC, Atlanta, GA (US)

( * ) Notice: Subject to any disclaimer, the term of this patent is extended or adjusted under 35 U.S.C. 154(b) by 78 days.

(21) Appl. No.: 14/747,486

(22) Filed: Jun. 23, 2015

(65) Prior Publication Data
US 2016/0378417 A1  Dec. 29, 2016

(51) Int. Cl.
G06F 3/14 (2006.01)
H04W 4/00 (2018.01)
H04L 29/06 (2006.01)
H04W 4/80 (2018.01)
G06F 3/0482 (2013.01)
H04W 84/20 (2009.01)

(52) U.S. Cl.
CPC .......... *G06F 3/1423* (2013.01); *G06F 3/0482* (2013.01); *G06F 3/1454* (2013.01); *H04L 63/083* (2013.01); *H04L 65/1089* (2013.01); *H04L 65/1093* (2013.01); *H04L 65/4038* (2013.01); *H04W 4/80* (2018.02); *G06F 2203/0383* (2013.01); *G09G 2354/00* (2013.01); *G09G 2358/00* (2013.01); *G09G 2370/022* (2013.01); *H04W 84/20* (2013.01)

(58) Field of Classification Search
CPC ...... H04L 29/06; H04L 65/1093; H04W 8/24; H04W 84/20; G08B 29/00; G08B 3/00; G06F 15/16; G06F 21/45; G06F 3/1423; G09G 5/00
See application file for complete search history.

(56) References Cited

U.S. PATENT DOCUMENTS

| 5,634,057 | A | 5/1997 | Dickinson | |
| 6,901,275 | B1* | 5/2005 | Aoyagi | H04W 84/20 455/574 |
| 8,576,750 | B1 | 11/2013 | Hecht | |
| 8,832,785 | B2* | 9/2014 | Stuntebeck | H04L 63/102 726/1 |
| 9,832,314 | B2 | 11/2017 | Shanmugam | |
| 10,474,416 | B1 | 11/2019 | Farivar | |
| 10,789,035 | B2 | 9/2020 | Tsubone | |
| 2002/0090914 | A1* | 7/2002 | Kang | H04W 84/20 455/41.2 |
| 2006/0208871 | A1* | 9/2006 | Hansen | G06F 3/1454 340/506 |
| 2007/0115346 | A1* | 5/2007 | Kim | H04N 7/148 348/14.02 |
| 2007/0198141 | A1 | 8/2007 | Moore | |

(Continued)

*Primary Examiner* — Benyam Ketema

(57) ABSTRACT

Systems and methods for allowing an orchestrator to manage screen sharing in a meeting between multiple user devices are described. The orchestrator can use a master device to start a sharing session and select user devices to join as participant devices. The orchestrator can also select at least one receiver for receiving shared media. Participant devices are displayed on the master device. The orchestrator can then select a participant device to act as a source, and a receiver to receive the shared media from the source. The master device can contact a management server to cause the selected participant device to being sharing its screen on the receiver.

20 Claims, 12 Drawing Sheets

(56) References Cited

U.S. PATENT DOCUMENTS

| | | | |
|---|---|---|---|
| 2009/0217177 A1* | 8/2009 | DeGrazia | H04L 51/046 715/753 |
| 2011/0276900 A1 | 11/2011 | Khan | |
| 2011/0307571 A1* | 12/2011 | Bakke | G09G 5/14 709/208 |
| 2013/0066974 A1* | 3/2013 | Yoakum | H04L 65/4038 709/205 |
| 2013/0271403 A1 | 10/2013 | Nagahara | |
| 2013/0309648 A1* | 11/2013 | Park | G09B 5/00 434/350 |
| 2014/0143672 A1 | 5/2014 | Kim | |
| 2015/0019694 A1* | 1/2015 | Feng | H04L 65/601 709/219 |
| 2015/0201023 A1* | 7/2015 | Kotab | H04L 65/60 709/208 |
| 2015/0230047 A1* | 8/2015 | Nishimura | H04M 1/72519 455/41.2 |
| 2015/0253938 A1* | 9/2015 | Maeda | G06F 3/0482 715/826 |
| 2015/0286816 A1* | 10/2015 | Adler | G06F 21/45 726/6 |
| 2015/0304484 A1 | 10/2015 | Halmstad | |
| 2015/0309765 A1 | 10/2015 | Nagahara | |
| 2015/0334245 A1 | 11/2015 | Lin | |
| 2016/0210006 A1 | 7/2016 | Banyai | |
| 2016/0378417 A1 | 12/2016 | Kenjalkar | |
| 2017/0118258 A1* | 4/2017 | Lieb | G06F 9/452 |

* cited by examiner

COLLABORATION SYSTEMS WITH MANAGED SCREEN SHARING

BACKGROUND

Screen sharing allows one meeting participant to broadcast their screen to other meeting participants. Screen mirroring technologies can allow a participant to broadcast media from a source computing device to a receiver. The source computing device, such as a laptop, can communicate with the receiver, such as a television display. The receiver then reproduces media received from the source. One source can connect to the display at a time.

However, current screen sharing technology limits how participants can collaborate using the receiver in a meeting setting. In a meeting, participants can take turns connecting their individual computing devices (e.g., laptops, tablets, or phones) to the receiver. To do this, whoever is currently using the receiver must disconnect, and the next participant must connect. Or, a user can be kicked off when another user initiates a screen sharing session. This can include multiple logins and reconfigurations for each participant. It can also distract from meeting discussions when participants are forced to focus on technical issues regarding screen sharing and coordinate who will connect to the screen at a given time. In a large meeting, it can be difficult for participants to coordinate the switching. This results in lost time and productivity in the meeting. It also does not allow control or access restrictions to be enforced, potentially allowing anyone to take over the screen during a meeting.

As an alternate collaborative solution, users can start a formal online meeting session. Connecting to online meeting services from a conference room by entering a user name, participant code, and joining an online meeting can be a hassle, again resulting in lost time and productivity. Additionally, sending shared media to an online intermediary can cause distracting visual and audio lag, and degraded media quality.

Neither approach adequately allows a meeting orchestrator to manage a meeting. Instead, it is up to individual participants to coordinate switching in and out of screen sharing.

Based on at least these problems in the technology, a need exists for collaboration systems with managed screen sharing.

SUMMARY

An example collaboration system can allow a master device to control which participant devices will share their screen on a receiver. The master device can initiate a session that user devices opt into as participant devices. The master device can select a receiver to use for display, and a participant device for sharing on the display. The master device can send these selections to a management server, which can cause the selected participant device to share its screen with the selected receiver. The management server can lock the receiver from being used during the session without authority from the master device. This can give the master device control over screen sharing, and prevent disruption from unwanted screen sharing on the receiver. The master device can also maintain the flexibility of selecting additional participant devices to share on the receiver.

It is to be understood that both the foregoing general description and the following detailed description are exemplary and explanatory only and are not restrictive of the examples, as claimed.

DESCRIPTION OF THE EXAMPLES

Figure 1:
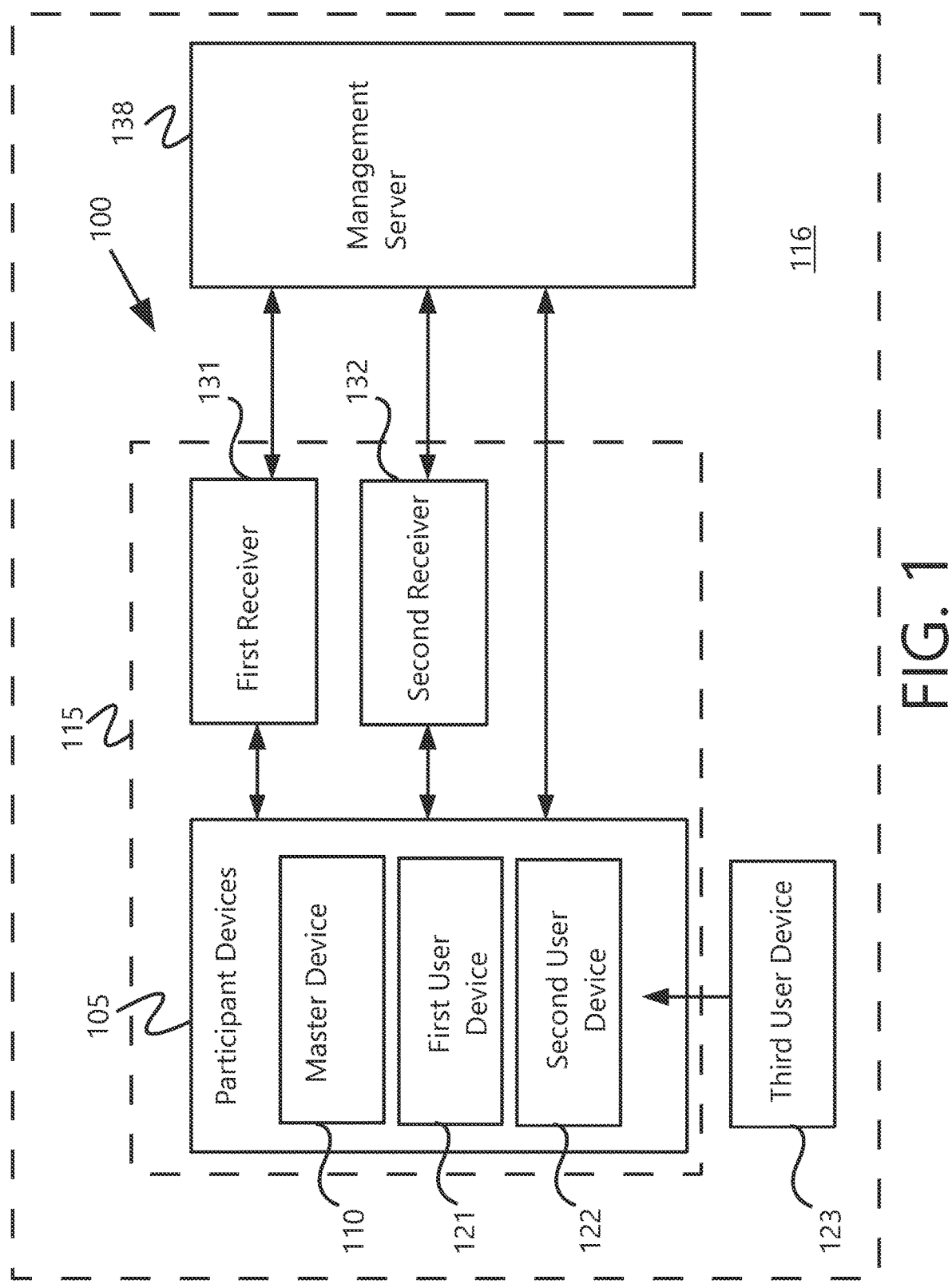
FIG. 1 is an exemplary system for orchestrated screen sharing between computing devices.

Reference will now be made in detail to the present examples, including examples illustrated in the accompanying drawings. Wherever possible, the same reference numbers will be used throughout the drawings to refer to the same or like parts.

Examples described herein include collaboration systems for efficient screen sharing in a conference environment. An orchestrating user can execute a sharing program on a master device, such as a laptop. The master device begins a sharing session, broadcasting a session identifier with a wireless protocol over an enterprise network. The wireless protocol can facilitate peer-to-peer communications, utilizing technologies such as Bluetooth, WIFI, or cellular. Potential participants can have user devices that communicate to the master device and join the session based on supplying the session identifier. The master device can present a graphical user interface where the orchestrating user can select which of the user devices to include in the session as participant devices. The master device can also listen for receivers that communicate peer-to-peer or over the network, and add one or more receivers to the session.

The orchestrating user (i.e., orchestrator) can then select a receiver and a first participant device to act as a source to the receiver. This can cause the master device to send a first request to a management server, identifying the selected first participant device and receiver. The management server can send a message to the first participant device to begin streaming its screen content to the receiver. The management server can also utilize a lock credential to prevent the receiver from being used by another source without authority from the master device. This can give the master device control over screen sharing, and prevent disruption from unwanted screen sharing on the receiver.

As an example, the master device can send a second request to the management server, requesting that a second participant device become the source to the receiver. The management server can recognize the second request as valid based on the lock credential, and send a second message to the second participant device to begin streaming to the receiver. But if the management server receives a third request to share at the receiver from a different device, it can refuse to initiate sharing without approval from the master device.

A "participant device" is an example of a user device that is participating in a sharing session. A "master device" can be a participant device that orchestrates the sharing session. A user device can be any mobile computing device, such as a cell phone, laptop, or tablet. Unless specified otherwise, the user device can also be a stationary computing device, such as a personal computer or workstation.

A "receiver" can be any processor-based device capable of receiving a media stream and outputting the media stream to a display or other media consumption hardware. An example receiver can include a television equipped with a processor and communication interface for pairing with a computing device and accepting a media stream. Another example receiver can include a dedicated media streaming device. The dedicated media streaming device can accept a media stream and output the received media in a video or audio format that can be consumed by other hardware, such as a monitor, television, or speaker system.

A conference is an example of an environment in which the system can operate over peer-to-peer networks, but other environments are also possible.

FIG. 1 illustrates an exemplary system 100 for collaboration between participant devices 105. A master device 110 executing a sharing application can initiate a collaboration session. The session can include a session identifier. A user of the master device 110, referred to herein as the orchestrator or master, can communicate the session identifier to users for the purpose of joining the session. Using the session identifier, user devices 121, 122, and 123 can communicate with the master device 110 to join the session.

The communications between user devices 110, 121, and 122 can include peer-to-peer communications. For example, the first user device 121 and second user device 122 can be in the same room 115 as the master device 110. The master device 110 can broadcast the session identifier, and the devices 121, 122 can look for the session identifier. Upon detection, devices 121, 122 can opt into the session. Opting in can cause devices 121, 122 to send participation requests to the master device 110. If approved by the master device 110, devices 121, 122 can become participant devices 105.

The master device 110 can also invite user devices to join the session over a network 116. For example, a third user device 123 executing the sharing application can be located on an enterprise network 116 with the master device 110, but not physically in the same room 115 as the master device 110. Alternatively, the third user device 123 can be connected to the network 116 via a virtual private network (VPN) connection. In one example, the master device 110 can invite the third user device 123 to the session by sending an invitation generated by the sharing application to the third user device 123.

This can include routing the invitation through the management server 138. The management server 138 can facilitate messaging between user devices 110, 121, 122, and 123 using a managed messaging protocol. The sharing application executing on the master device 110 can utilize the managed messaging protocol to communicate with the management server 138. The management server 138 can then send a message to the third user device 123 by calling a procedure of an application programming interface (API) executing on the third user device 123. This can alert the third user device 123 that the master device 110 is inviting the third user device 123 to join a shared session. If the third user device 123 responds by opting into the sharing session, the third user device 123 sends a participation request to the master device 110. If the participation request is not rejected, the third device 123 becomes another participant device 105 in the session.

In this example, the master device 110 can also detect the first receiver 131 and the second receiver 132. Both can be in proximity for wireless peer-to-peer communications, such as in the same room 115. Alternatively, they can be connected to the same network 116 as the master device. The first receiver 131 and second receiver 132 can each broadcast a signal that indicates they are available for screen sharing. The signal can be broadcast wirelessly and/or over an enterprise network 116. The first receiver 131 and second receiver 132 can both include a processor and an API that includes procedure calls for pairing with a source and receiving a media stream. For example, the first receiver 131 and second receiver 132 can be televisions executing the software, such as an APPLE TV. The source can execute software that makes the API procedure calls to the receiver 131 or 132. This can allow the source to pair with the receiver 131 or 132 and share its screen by streaming a mirror image of what is being displayed on the source, in an example.

In one example, the management server 138 can store a list of approved receivers. Only the approved receivers can be displayed as options on the master device 110. An administrative user can modify or create the list of approved receivers on the management server 138. When the master device 110 detects a receiver, it can compare it against the list of approved receivers before displaying it as an option to the orchestrator.

The management server 138 can manage functional aspects of the user devices 110, 121, 122, and 123. For example, the sharing application can be one of a suite of managed applications that the management server 138 can lock user devices 110, 121, 122, and 123 into. The management server 138 can also provide enterprise mobility management software to devices 110, 121, 122, and 123 that can prevent users from intermingling personal data on their computing devices with company data. It can also help prevent the enterprise network 116 from being infected by viruses or malware within the personal data of the computing device. In one example, the management server 138 can log and store meeting and screen sharing data in a share application container on a user device. This data can be wiped from the user device by the management server 138 without effecting the user's personal information.

Management server 138 can include one or more servers. The management server 138 can also utilize one or more messaging servers owned by third parties located at different locations to send messages to user devices 110, 121, 122, and 123. The user devices 110, 121, 122, and 123 can be running different operating systems with which different messaging servers can communicate. In one example, the management server 138 and messaging server are part of the same server. In another example, system 100 can use its own messaging server, alone or in combination with messaging servers for a particular operating system. For the purposes of this disclosure, it is to be understood that the management server can utilize a messaging server in sending communications to a computing device, such as a user device 110, 121, 122, and 123 or a receiver 131 and 132.

The management server 138 can communicate over the network 116 with the receivers 131 and 132, in an example. In one example, the management server can make API procedure calls to change settings of the receiver, such as the receiver name or password.

After the master device 110 has organized a sharing session and at least one participant device 105 and receiver 131 has joined, the master device 110 can orchestrate screen sharing. For example, the master device 110 can receive a selection of a first receiver 131 to utilize for media presentation (e.g., video or audio). The master device 110 can further receive a selection of a first participant device 121 to act as a source to the selected receiver. Then the master device 110 sends a sharing request to the management server 138, indicating the selected first participant device 121 and first receiver 131.

The management server 138 can set a lock credential that prevents use of the first receiver 131 without authorization from the master device 110. The management server 138 can also send a message to the first participant device 121 to initiate screen sharing. This can include making an API procedure call at the first participant device 121. If the first participant device 121 accepts the screen share request, then it attempts to pair with the first receiver 131 and act as the media source for the first receiver 131.

As a further example, the master device 110 can select a second participant device 122 to begin screen sharing on the first receiver 131. This can cause the master device 110 to send a second request to the management server 138. The management server 138 can verify that the master device 110 has authority to override any existing control of the first receiver 131 based on the lock credential. Then, the management server can send a message to the first participant device 121 to discontinue screen sharing, and another message to second participant device 122 to initiate screen sharing on the first receiver 131. Alternatively, the management server can broadcast a single message to all participant devices that includes an instruction to the first participant device 121 to discontinue screen sharing and another instruction to the second participant device 122 to initiate screen sharing.

In another example, the master device 110 can be the first participant device. The master device 110 can share its own screen on the first receiver 131, and then submit a second share request to the management server 138 to cause a second participant device 122 to share its screen on the receiver 131.

Figure 2A:
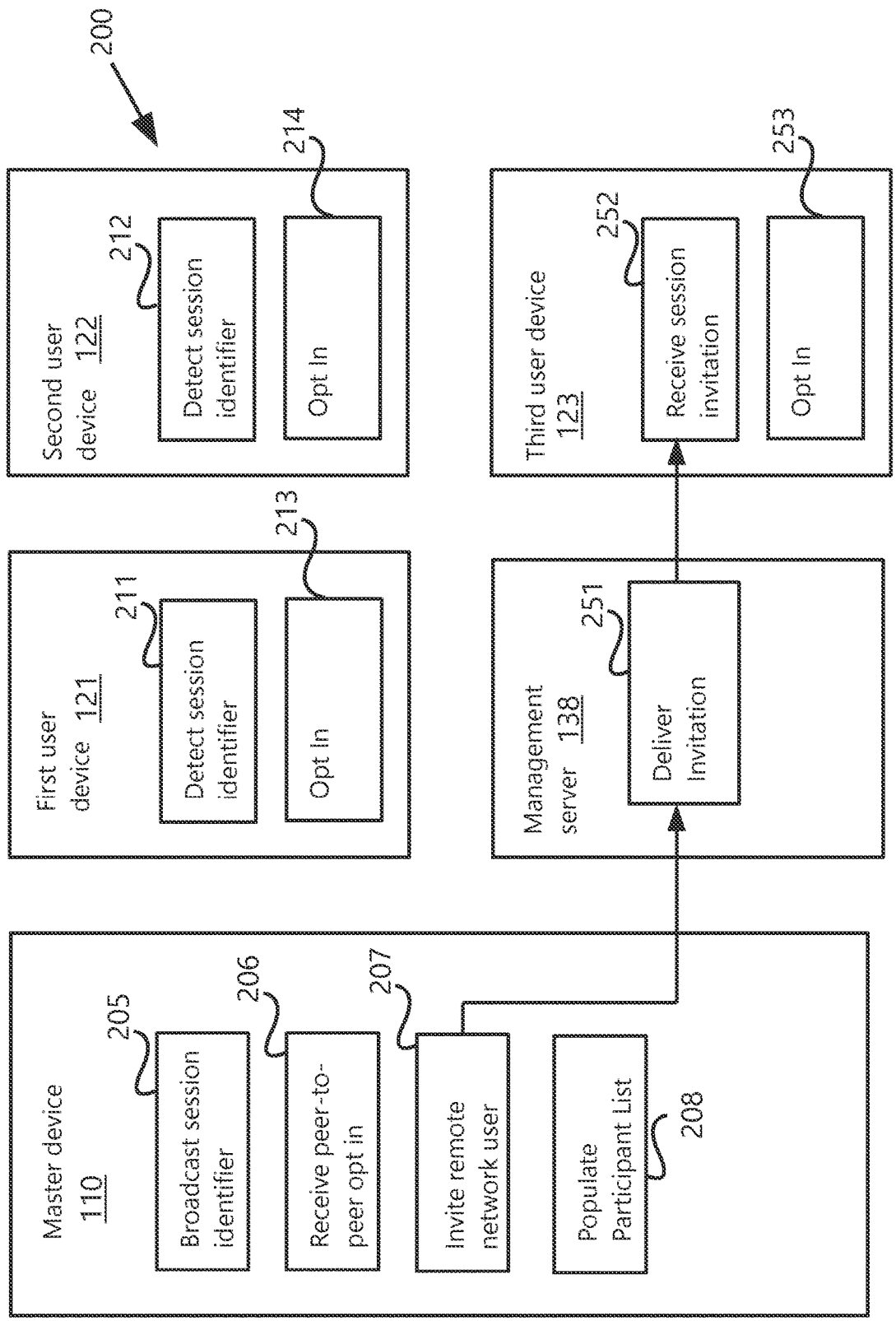
FIGS. 2A-2C are exemplary methods for setting up an orchestrated sharing session.
Figure 2B:
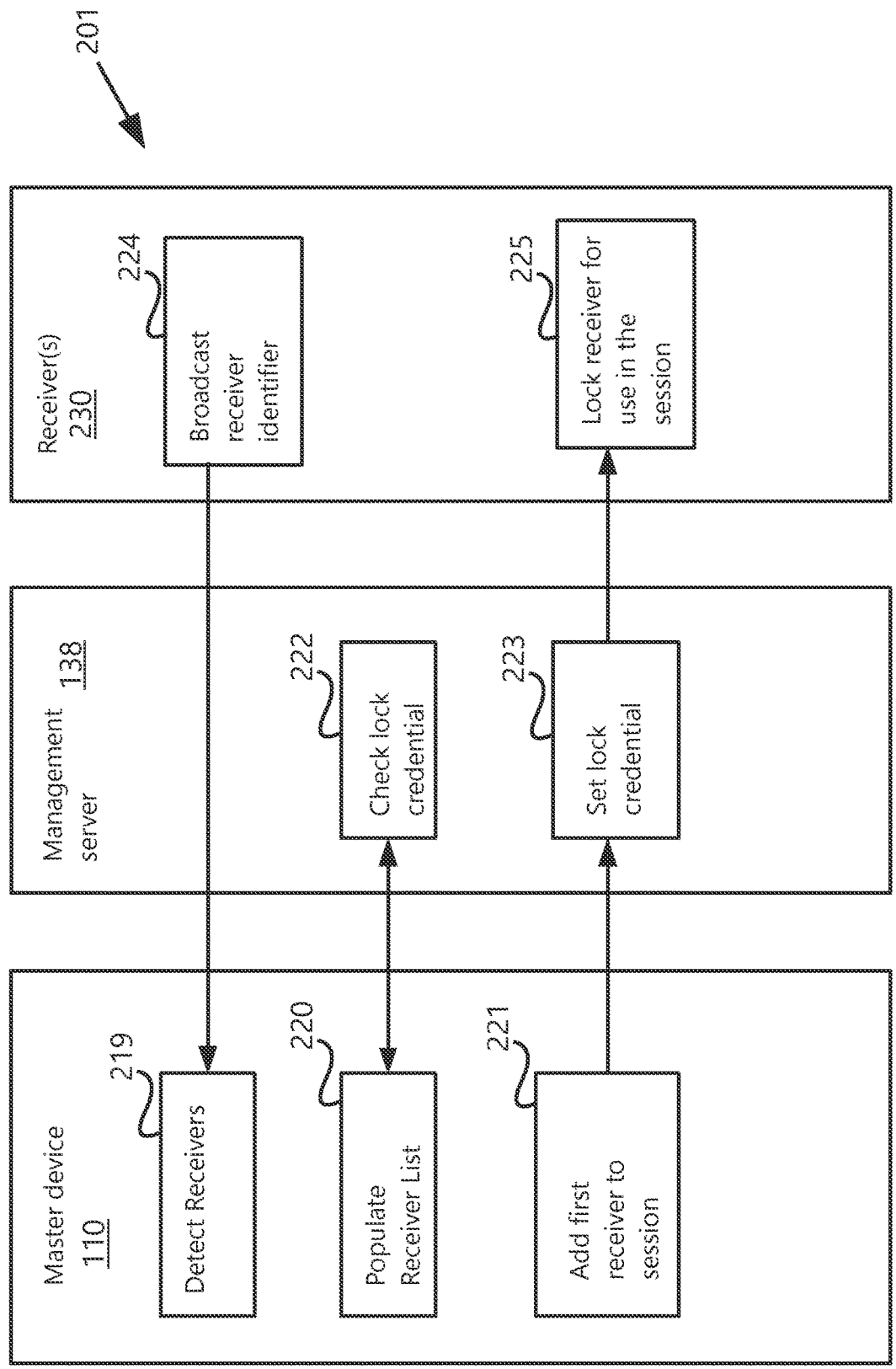
Figure 2C:
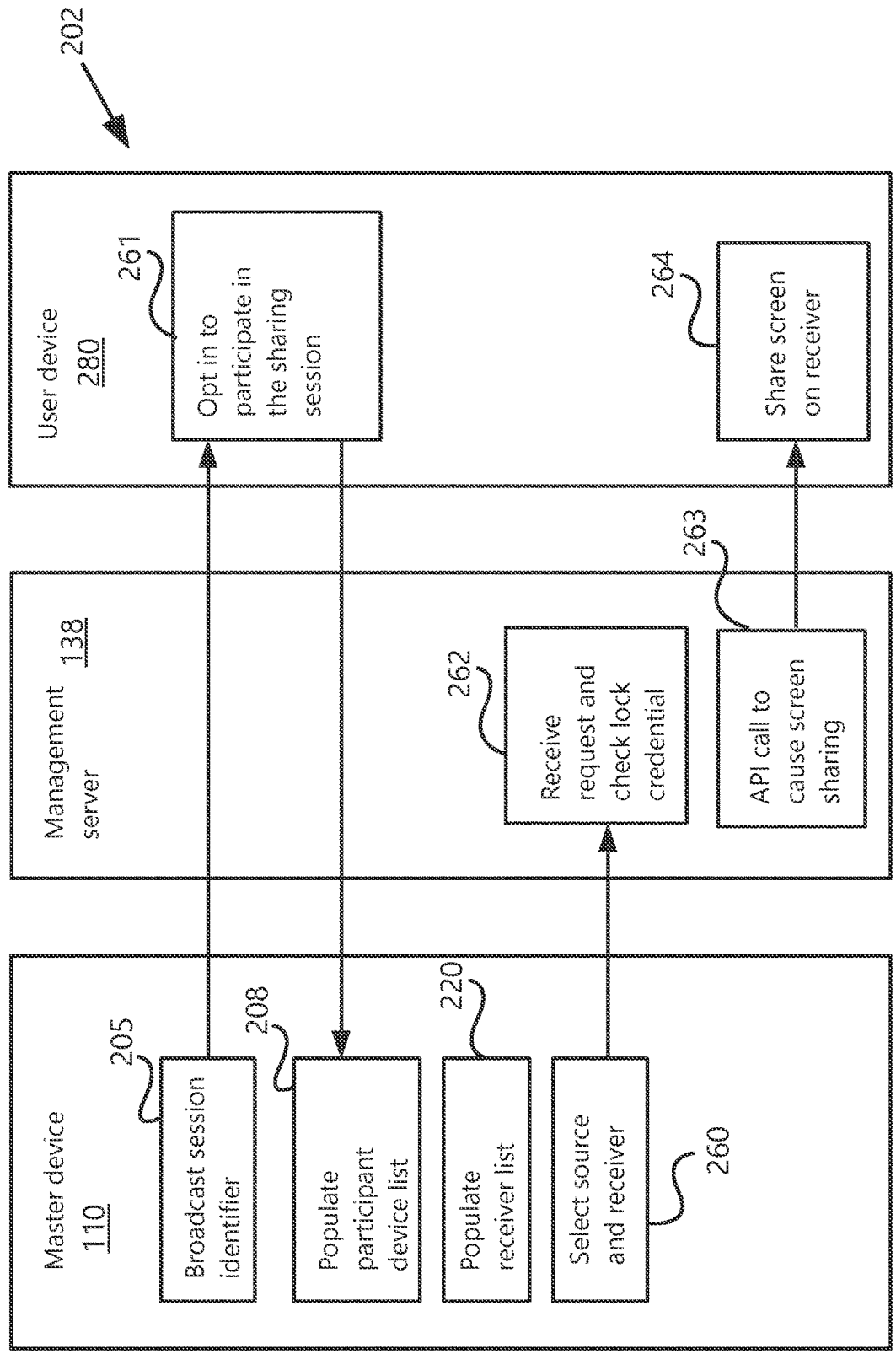

FIGS. 2A-2C are exemplary flow charts with example steps for setting up a sharing session in a system 200. Turning to FIG. 2A, exemplary stages for populating a participant list in a sharing session are presented. The participant list can be any graphical representation of a plurality of participants or associated participant devices.

At stage 205, the master device 110 can broadcast (e.g., transmit) a peer-to-peer session including a session identifier. This can occur when the master user executes a sharing application on the master device or selects an option to begin a new session. The peer-to-peer communications can rely on one or more wireless transmission protocols such as Bluetooth, local WIFI connectivity, or other peer-to-peer communication protocols in examples. The peer-to-peer transmissions can occur directly between devices without the need for a server to manage opt-in communications or information transfer.

As one example, the master device 110 can instantiate a multipeer object. The multipeer object can fetch session metadata, such as a session name or password defined by the orchestrating user. The metadata can be used to create the session identifier. For example, the multipeer object can generate a service type including a string format: "sh-[share identifier]". A multipeer object can also hold a reference to the master device 110. A communication pair identifier can become active once the master device 110 and a first user device 121 connect with one another over the multipeer protocol. The communication pair identifier can allow both devices 110 and 121 to identify back and forth peer-to-peer communications, and can void when the connection is inactive or suspended.

At stages 211 and 212, the first user device 121 and the second user device 122 can detect the session broadcast. In one example, the first user device 121 can execute the sharing software, causing the first user device 121 to listen for broadcasts of a particular service type (e.g., "sh"). To connect, the first user device 121 can prompt a first user to enter the session identifier. This can act as a barrier to unauthorized user devices joining a sharing session.

In another example, the broadcast can be recognized by a text protocol that executes on the first and second user devices 121 and 122. The text protocol can be included in a suite of managed functionality that executes on the user devices 121 and 122 that connect to an enterprise network 116. Therefore, if user devices 121 and 122 are in a managed or locked state that separates personal data from an enterprise network 116, they can detect the broadcast.

At stages 213 and 214, the first and second user devices 121 and 122 can opt into the sharing session. This can cause the first and second user devices 121 and 122 to communicate back to the master device 110. The first user device 121 can securely communicate with the master device 110 using a first communication pair identifier. The second user device 122 can do so using a second communication pair identifier.

At stage 206, the master device 110 can receive an opt-in message (e.g., participation request) in a peer-to-peer communication with the first user device 121. The master device 110 can present the orchestrator with the option of adding the first user device 121 as a participant device in the session. If the orchestrator selects to do so, then the master device 110 can add the first user device 121 to the list of participants at stage 208. For purposes of this disclosure, user devices added as participants in the sharing session will be referred to as participant devices.

In another example, the orchestrator can configure a whitelist of allowed participants. When an opt-in message (e.g., participation request) is received, the master device 110 can compare the requesting user device 121 against the whitelist. If the requesting user device 121 is in the whitelist, the master device 110 can add the user device 121 as a participant device.

At stage 207, the master device 110 can invite a remote user to join the sharing session. The remote user can have a third user device 123 that is non-proximate to the master device 100, such that it does not receive peer-to-peer broadcasts. In one example, the third user device 123 can be connected to the same network 116 as the master device 110. For example, the third user device 123 can be connected to the network 116 but in a separate room. Alternatively, the third user device 123 can be connected to the network 116 from a different geographic location, such as with a virtual private network (VPN) connection.

The master device 110 can send the invitation to the management server 138. The management server 138 can locate the third user device 123 and notify it to retrieve a message at stage 251. The third user device 138 can then connect to the management server 138 and retrieve the invitation at stage 252. The invitation can include a token for use in communicating with the master device 110 in one example. At stage 253, the third user device 123 can opt into the sharing session.

At stage 208, the master device can further populate the participant list. User devices 123 that were specifically invited by the master device 110 can be added as participant devices without further interaction from the orchestrator (e.g., master user).

FIG. 2B includes exemplary stages for populating a receiver list in a sharing session using exemplary system 201. At step 224, receivers 230 can each broadcast receiver identifiers. These can be broadcast over the enterprise network. They can also be broadcast over a peer-to-peer transmission based on proximity. The receivers 230 can continue broadcasting as long as they are on. In another example, some receivers 230 can be configured by the management server 138 to only broadcast when they are not already paired with a source. The management server 138 can also set a password for a receiver 230. In that example, a potential source would need to supply the password before pairing with the receiver 230.

At stage 219, the master device 110 can begin detecting receivers 230. This can occur when the master device 110 initiates the shared session. Alternatively, it can occur when the sharing application is executed or before the participant list is populated. This can ensure that a receiver is available before user devices 121, 122, and 123 are invited or accepted into the session.

Based on the detected receivers, at stage 220 the master device 110 can begin populating a receiver list. For example, the master device 110 can select receivers 230 that will be used in the session as shown in FIG. 5B.

Continuing with the example of FIG. 2B, the master device 110 can contact the management server 138 to check whether a receiver 230 detected at stage 219 is available for use. At stage 222, the management server 138 can check a lock credential for the receiver 230. This can include checking whether the receiver 230 is currently associated with a different master device or sharing session. The lock credential can include an association between a master device and the receiver, a whitelist of allowable sources, or a password required for pairing with the receiver. The lock credential can be stored in a database accessible by the management server 138.

The management server 138 can notify the master device 110 if the lock credential indicates the receiver 230 is unavailable. The management server 138 can deny the sharing request in this situation. In another example, the management server 138 can allow the master device 110 to send a message to a second master device (not pictured) associated with the lock criteria. This can give the second master device an option to relinquish control over the locked receiver 230.

In one example, the master device 110 does not add the locked receiver 230 to the receiver list at stage 220. Alternatively, the master device 110 can add the locked receiver 230 but visually indicate that it is locked. If the orchestrator selects it as a receiver to use in the sharing session, the management server 138 can send a message to the other master or source computing device associated with the lock credential. The message can give the other associated device the option to relinquish control of the receiver 230. In one example, if the orchestrator selects the locked receiver 230, the master device 110 notifies the orchestrator which computing device is associated with the lock credential on the receiver 230, allowing the orchestrator to send a text to that computing device through use of the managed text protocol.

As part of populating the receiver list at stage 220, the master device 110 can organize available receivers 230 based on proximity to the master device 110. For example, the master device 110 can prioritize peer-to-peer receivers 230 over receivers 230 detected only through the enterprise network. This can allow an orchestrator to more quickly identify and select the receiver(s) 230 in the meeting room 115 for use in the sharing session.

At stage 221, the management device 110 can receive selection of at least one of the detected receivers 230 to add to the sharing session.

In an example, the master device 110 can send a message indicating the selected receiver(s) 230 to the management server 138. Then, at stage 223, the management server 138 can set the lock credential to prevent the selected receiver(s) 230 from being used without authority from the master device 110. The management server 138 can do this by storing an association between the master device 110 and the receiver. The management server can also store a whitelist of allowable sources, or changing a password required for pairing with the receiver.

In one example, the receiver 230 can include an API with a procedure that the management server 138 can use to set the new password on the receiver 225 at stage 225. The password can be required by a source attempting to connect with and use the receiver. By changing the receiver password and providing the password only to an authorized source, other sources can be prevented from screen sharing with a receiver that is in use. Alternatively, the management server 138 can send a device identifier to the receiver 230 to prevent pairing with any participant device other than the one having the device identifier. This can help prevent other user devices in the room from taking over control of the receiver 230 without consent of the orchestrator.

FIG. 2C includes exemplary stages for initiating screen sharing on a user device 280 using an exemplary system 202. At stage 205, the master device can broadcast a session having a session identifier, as described with regard to FIG. 2A. The user device can opt-into the session at stage 261, as previously described with regard to stages 213, 214, and 253 of FIG. 2A. In one example, a user can opt-into the sharing session by submitting an email address.

At stage 220, the master device 110 can populate the participant device list based on which user devices are accepted as participants. In one example, the master device 110 can include a whitelist of email addresses that is created based on a meeting invitation. For example, if a project manager electronically sends a meeting invitation to several other employees, the master device 110 or management server 138 can convert the invitee email addresses into a whitelist for the session. Based on the time of the shared session aligning with a start time specified in the meeting invitation, the master device 110 can utilize the whitelist. A user device 280 that submits an email address contained on the whitelist can be automatically added to the participant list without further approval from the orchestrator (e.g., the project manager).

At stage 220, the master device 110 can populate the receiver list, as described with regard to FIG. 2B or as illustrated in FIG. 5B. In one example, at least one receiver can be added to the receiver list before the master device 110 sends invitations to user devices to join as participant devices. This can ensure that a receiver is available for screen sharing before the master device attempts to otherwise coordinate the sharing.

At stage 260, the orchestrator can select a source and a receiver on the master device 110. The source can be one of a plurality of participant devices in the participant list. The receiver can be one of at least one receiver in the receiver list. In another example, the orchestrator can select multiple participant devices for display on the receiver. The receiver can be configured to display multiple screens at one time. In still another example, the orchestrator can select multiple receivers for one or more source participant devices. A first receiver can be selected for a first participant device 280 and a second receiver can be selected for a second participant device. Alternatively, the first and second receiver can be selected for the first participant device, which can cause the first participant device 280 to share its screen simultaneously on both receivers.

At stage 262, the management server 138 can receive a sharing request from the master device 110 that identifies the selected source (e.g., selected participant device 280) and receiver. The selected source can be identified based on the participant name or a participant device identifier. The request can indicate the receiver and include a command to start sharing the source on the receiver. The request also can identify the master device as the requester. The management server 138 can check a lock credential associated with the receiver to determine that the source (e.g., selected participant device 280) can pair with the receiver. The lock credential can include an association with a computing device that is controlling the use of the receiver. If the computing device identified in the lock credential is the same as the master device 110 or the source (e.g., selected participant device 280), then at stage 263 the management server can send a message to the participant device 280 to begin sharing.

As an example, the management server 138 can maintain a whitelist of computing devices that are allowed to share media with the receiver. The master device 110 can be on the whitelist. Additionally, the master device 110 can have permission to modify the whitelist. When the management server 138 receives the share request at stage 262, it can add the selected source (e.g., participant device 280) to the whitelist and remove a prior source from the whitelist. In this way, at any one time the whitelist can contain the master device 110 and, if the master device 110 is not the source, at least one source participant device 280. In another example, the master device 110 can set a whitelist of permissible source participant devices 280 so that those participant devices can freely share content with the receiver without further orchestration from the master device 110.

In still a further alternative example, the white list can include only the master device 110. When the master device 110 selects a participant device 280 to begin screen sharing, the participant device 280 can become the new master device, such that the whitelist is updated to include only the participant device 280. As the new master device, the participant device 280 can select an additional participant device for screen sharing, and that additional participant device can then become the master device. In this example, the management server 138 can maintain a first whitelist that contains the current master device and a second whitelist of participant devices. The current master device can select a new source from the second whitelist, causing the source to become the new master device.

In a further example, the lock credential can further include a password for pairing the receiver. The password can be set differently each time the master device 110 selects a new source for the receiver, and sent to both the new source and the receiver.

At stage 263, management server 138 can send a message to the participant device 280 to begin sharing its screen with the receiver. In one example, the participant device 280 can display a prompt indicating that the orchestrator wishes to begin sharing the user's screen. The user can accept or reject the share request. Additionally, the message from the management server 138 to the participant device 280 can include a password to use for pairing with the receiver. The message can include a call to an API procedure on the participant device 280 utilized in causing screen sharing functionality to execute.

If the share request is accepted by the user device 280, at stage 264, the participant device 280 can initiate screen sharing at the receiver. This can include supplying a password to the receiver and pairing through use of a wireless transmission protocol for screen sharing. The source can also automatically provide the password that it received when its request was accepted. In this example, the password can remain hidden from a user to prevent a user from sharing the password and circumventing the access controls. The receiver can then terminate a prior media stream in one example. In another example, the management server 138 separately message the prior source or the receiver to cause streaming to stop.

Figure 3A:
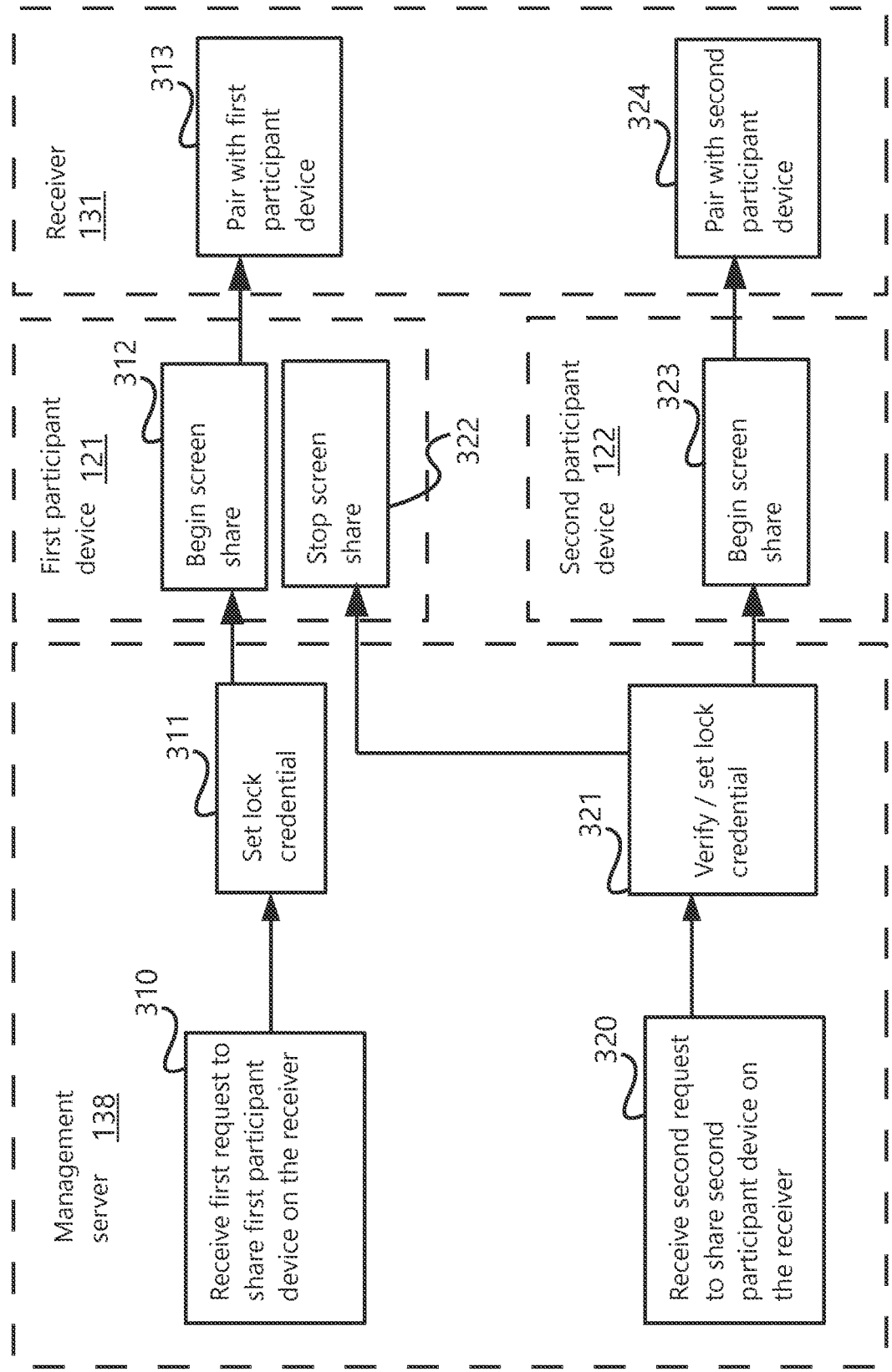
FIGS. 3A-3B are exemplary methods for managing use of receivers by participant devices.

FIG. 3A includes exemplary stages for switching screen sharing between participant devices 121 and 122. At stage 310, the management server 138 can receive a request to share media from a first participant device 121 on a receiver 131. The request can be sent from a master device 110. In another example, the request can come from the first participant device 121. In still another example, the request can come from the receiver 131 in response to receiving a request from the first participant device 121.

At step 311, the management server 138 can set a lock credential. This can include updating a whitelist or password. The new password can be sent to the first participant device 121 and the receiver 131. The lock credential can restrict other devices from interrupting the sharing without permission from the master device 110. In another example, the management server 138 can also call a procedure at the receiver 131 to set the receiver 131 to only receive one screen share at a time.

At stage 312, the management server 138 can cause screen sharing procedures to execute on the first participant device 121. API procedures executing on the first participant device 121 can cause the first participant device to communicate with receiver 131, which can be executing compatible API procedures for screen sharing. The first participant device 121 can provide its device identifier and the password, which, when accepted, can cause the receiver 131 to pair with the first participant device 121 for screen sharing at stage 313.

At stage 320, the management server 138 can receive a second request to share media from a second participant device 122 on a receiver 131. This request can come from the master device 110, second participant device 122, or the receiver 131. If the second participant device 122 sends the request directly to the receiver 131, the receiver 131 can deny access because the second participant device 122 will not have the current receiver password.

At stage 321, the management server 138 can verify that the lock credential allows for the second participant device 122 to pair with the receiver 131. If the second request is from the second participant device 122 or the receiver 131, an identifier for the second participant device 122 can be checked against a whitelist. Alternatively, a supplied password can be checked against a stored password for the receiver 131. If the request the verification fails, the management server 138 can send a message back to the requesting device to deny the sharing request.

If the second request is from the master device 112, the management server 138 can update the whitelist and/or password. This can include adding the second participant device 122 to the whitelist and removing a prior source from the whitelist. It can also include sending a password to the second participant device and the receiver 131.

At stage 322, the management server 138 can send a message to the first participant device 121 to cause it to stop sharing its screen with receiver 131. This can include an API call to the first participant device 121.

At stage 323, the management server 138 can send a message to the second participant device 122 to cause it to start sharing its screen with receiver 131. This can include an API call to the second participant device 122. It can also include supplying a password to the second participant device 122 and receiver 131. This can cause the receiver 131 to pair with the second participant device 122 for screen sharing at stage 324.

Figure 3B:
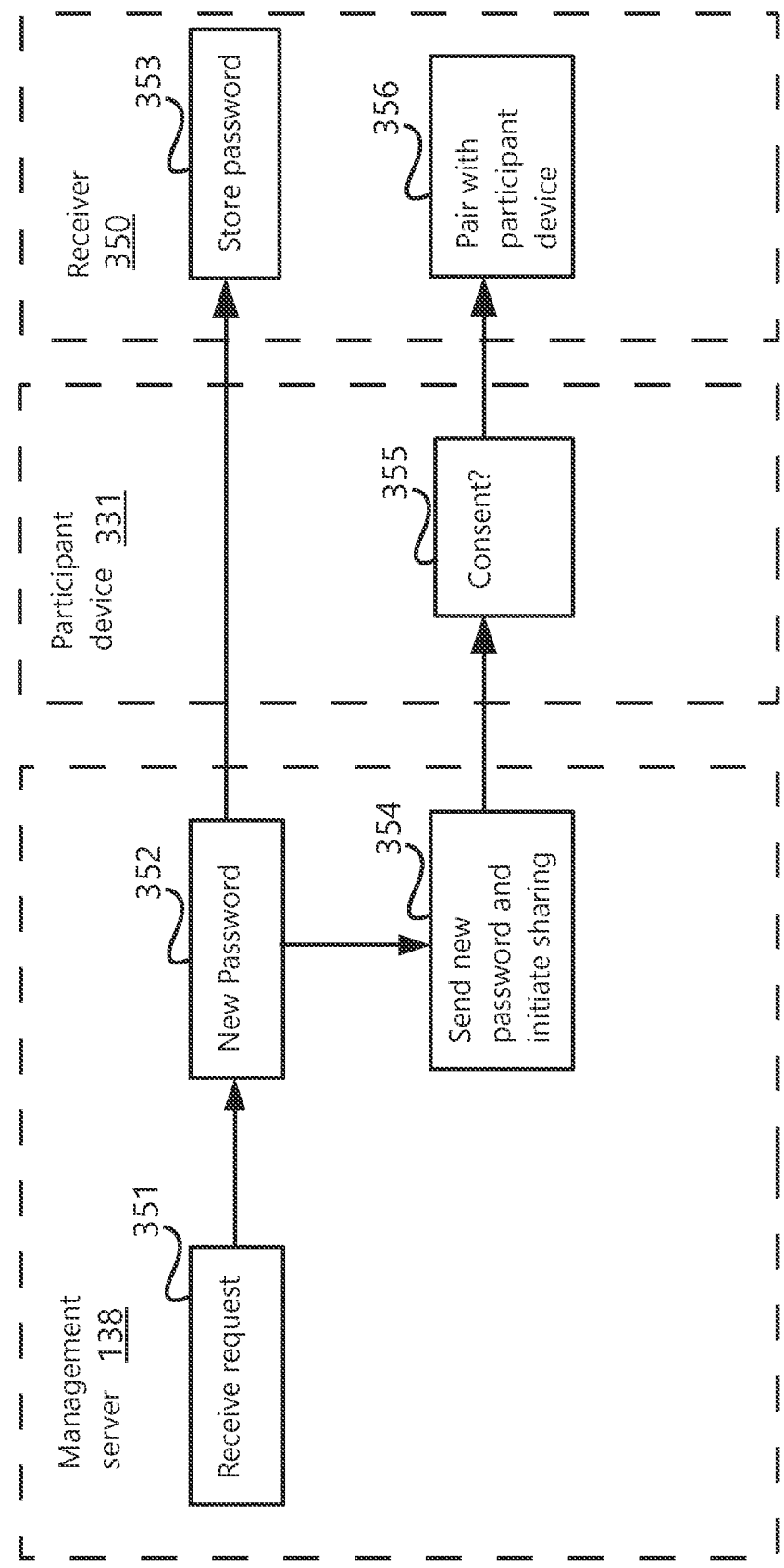

FIG. 3B includes exemplary stages for switching screen sharing to a participant device 331 through changing receiver 350 passwords. At stage 351, the management server 138 can receive a sharing request. If the request is from the master device 110 or a participant device 331 on a whitelist, the management server can generate a new password for the receiver 350 at stage 352.

The management server 138 can then send the new password to the receiver 350 by using an API procedure at the receiver 350 for setting the password. At stage 353, the receiver 350 can store the new password.

At stage 354, the management server 138 can send the new password to the participant device 331. The management server 138 can also call a procedure at the participant device 331 to initiate sharing at the receiver.

If the participant device 331 consents to screen sharing at stage 355, it can supply the password and cause the receiver to pair with the participant device 331 at stage 356. Unlike a formal online meeting session, media can stream directly from the participant device 331 to the receiver 350. This can allow for a higher quality media presentation with fewer delays, pixilation, or audio artifacts than routing the shared media through an intermediary, such as online meeting server.

Figure 4:
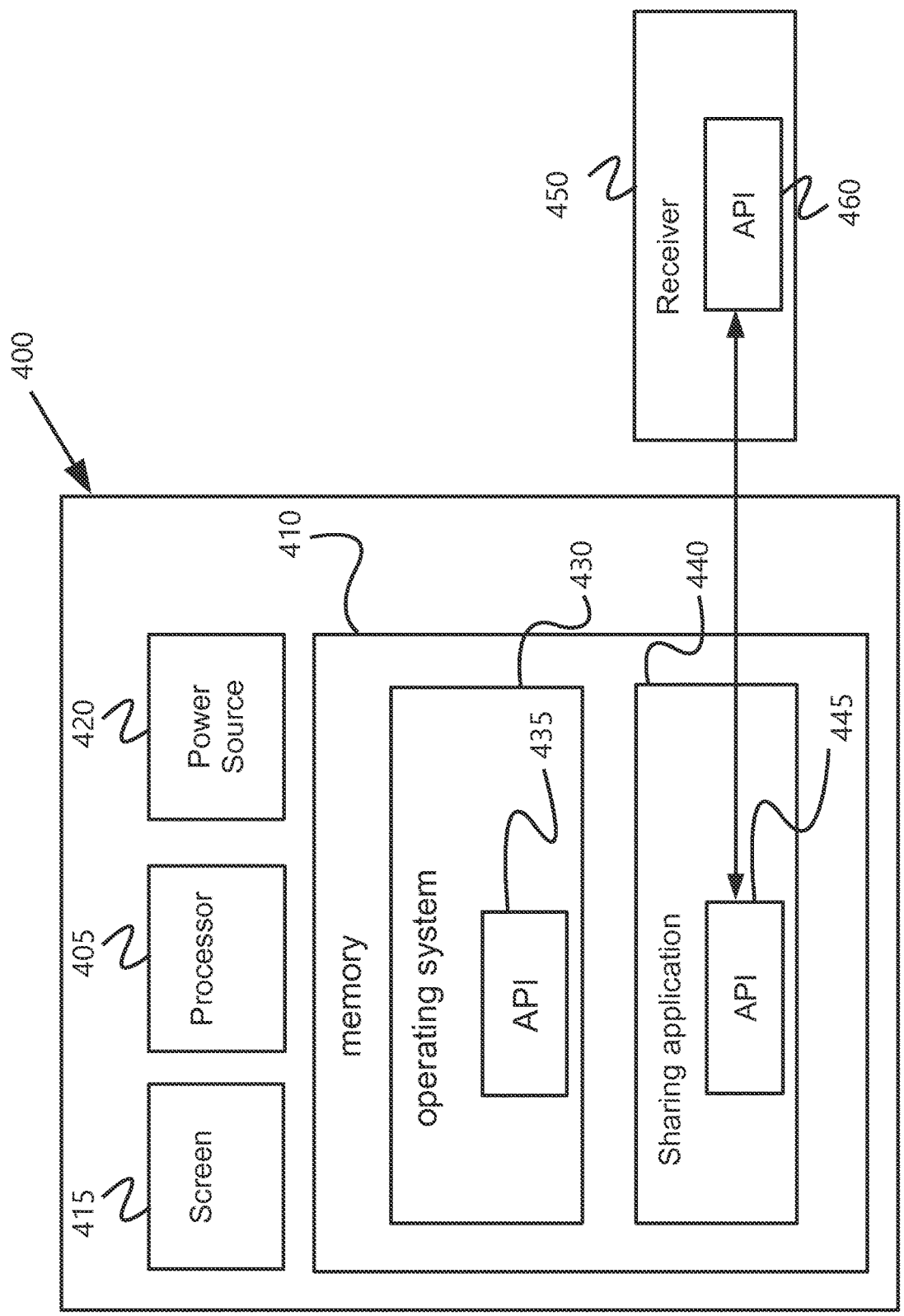
FIG. 4 depicts exemplary components of a user device.

FIG. 4 is an exemplary illustration of hardware and software running on a user device 400. The processor 405 can be powered by a power source 420, such as a battery or power supply. The processor 405 can execute instructions stored on a non-transitory, computer-readable medium 410. These instructions can cause the user device 400 to run software for use in screen sharing in an environment. This can include APIs 435 or 445 for implementing management services that allow the management server 138 to interact with the user device 400. The user device 400 can also include a screen 415 for displaying a graphical user interface.

The processor 405 can execute instructions to run an operating system 430. The operating system 430 can execute a management services API 435 that includes procedure calls for managing applications and other device functionality. For example, the management services API 435 can include a procedure call for locking the user device 400 into one or more managed applications. Management services API 435 can also include procedures for causing the user device 400 to contact the management server 138 and fetch an instruction or lock.

A user can maintain all of their personal data and applications on their user device 400 (e.g., in unmanaged applications). The work-specific apps can be easily uploaded, updated, or even deleted from user device 400 by an administrator of the management server 138, for example, when the user device 400 is lost or stolen. To facilitate the management services, the user device 400 can use a combination of the management services API 435 and application-level APIs 445.

In one example, the application-level API 445 includes a managed messaging API that routes chat messages to the management server 138. The messaging API can be invoked and used as part of a sharing application 440. The sharing application 440 can use the messaging API to send sharing invitations to other users on the managed enterprise network. This can allow the management server 138 to manage the sharing requests as described herein.

The application-level API 445 can control other functionality as well. For example, in initiating a meeting through the sharing application, the orchestrator can set the meeting to highly confidential. This can cause the management server 138 to manage participant devices by temporarily locking them into configurations that disable copy/paste, prevent use of camera, prevent screen shot functionality, or include trusted device detection. The management server 138 can also detect and wipe compromised user devices 400.

In another example, APIs 435 or 445 can include procedures specific to screen sharing on a receiver 450. The receiver 450 can include an API with compatible screen sharing procedures. The set of procedures between the user device 400 and receiver 450 can allow the user device 400 to pair with the receiver 450.

In one example, the management server 138 can determine which version of screen sharing procedures are executing on the receiver 450. For example, different receiver manufacturers can include different sets of API protocols for use in screen sharing. To facilitate a sharing request, the management server 138 can determine which protocols and procedures will be used based on the selected receiver 450. Then, the management server 138 can cause the source user device 400 to execute the screen sharing procedures compatible with those of the selected receiver 450.

Figure 5A:
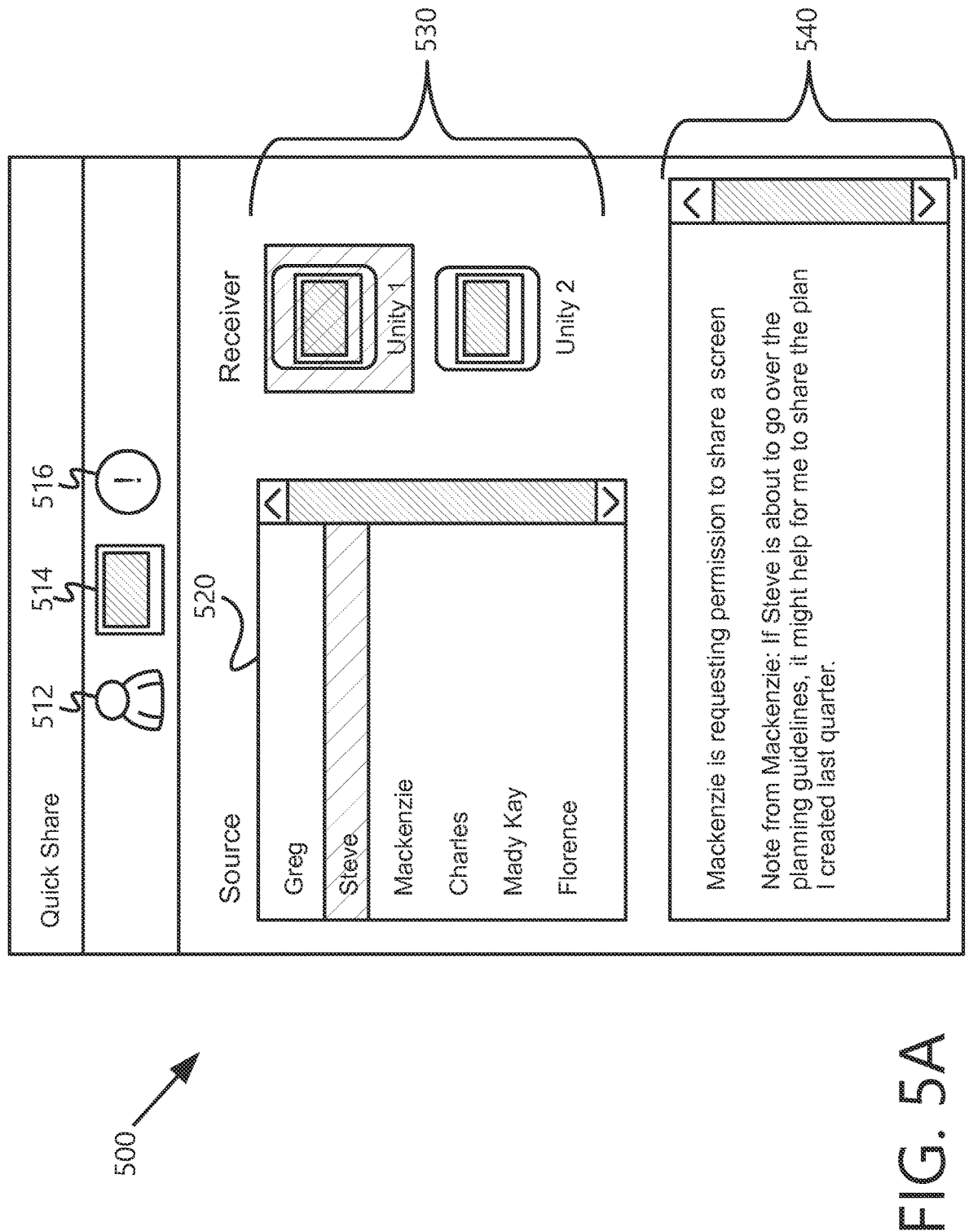
FIGS. 5A-5B are exemplary illustrations of a graphical user interface on a master device.
Figure 5B:
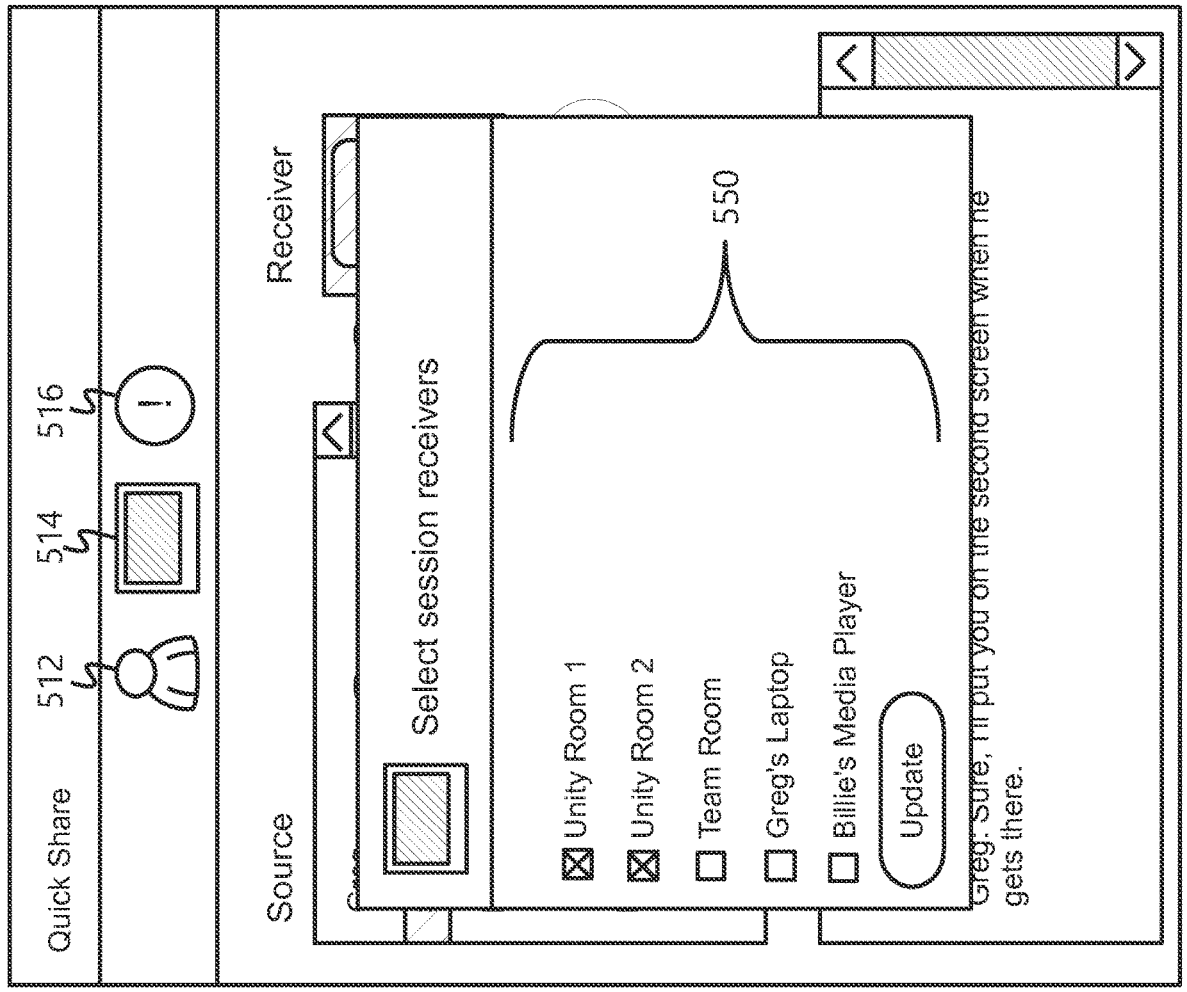

FIGS. 5A-5B are exemplary illustrations of a graphical user interface 500 on a master device 110. Turning to FIG. 5A, the graphical user interface 500 can include a list of participant devices 520 and a list of receiver devices 530. The orchestrator can select at least one participant device to pair as a source with at least one receiver device. In this example, Steve's user device has been selected as a source for a receiver called Unity 1. As a result, both Steve and Unity 1 are visually highlighted to indicate the pairing.

A text box 540 can allow the orchestrator to receive notifications regarding share requests without interrupting the flow of a live presentation. In this example, a participant device associated with Mackenzie has requested permission to share a screen. This can be generated from a sharing application executing on Mackenzie's user device. In another embodiment, Mackenzie can use a managed chat application to send messages to the orchestrator. The management server 138 can route those messages into the sharing application by determining that Makenzie is present in the orchestrator's sharing session. This can cause the messages to display in the text box 540 on the master device 110.

The orchestrator can add participants by clicking the participant icon 512. This can allow the orchestrator to invite particular users or scan for nearby peer-to-peer user devices. The orchestrator can change sharing session settings using icon 516. This can allow the master device 110 some level of control over user device functionality during the session. The orchestrator can also add one or more receivers to the session using the receiver icon 514.

The graphical user interface 500 can allow the orchestrator to set a first whitelist of participants that can join the session. The orchestrator can also set a second white list of participant devices that can share as a source to a receiver. The whitelist can also be established automatically. For example, all enterprise users can be added, or all participants who were on a calendar meeting request can be added.

The plurality of participants can be stored as a group for future use on the management server 138. This can allow a master device 110 to easily setup a sharing session that is reoccurring, such as a periodic team meeting.

Turning to FIG. 5B, in one example, the receiver list 530 can be populated using example selections 550. In this example, the orchestrator has selected the receivers Unity Room 1 and Unity Room 2, which can both be located in a conference room.

Figure 6:
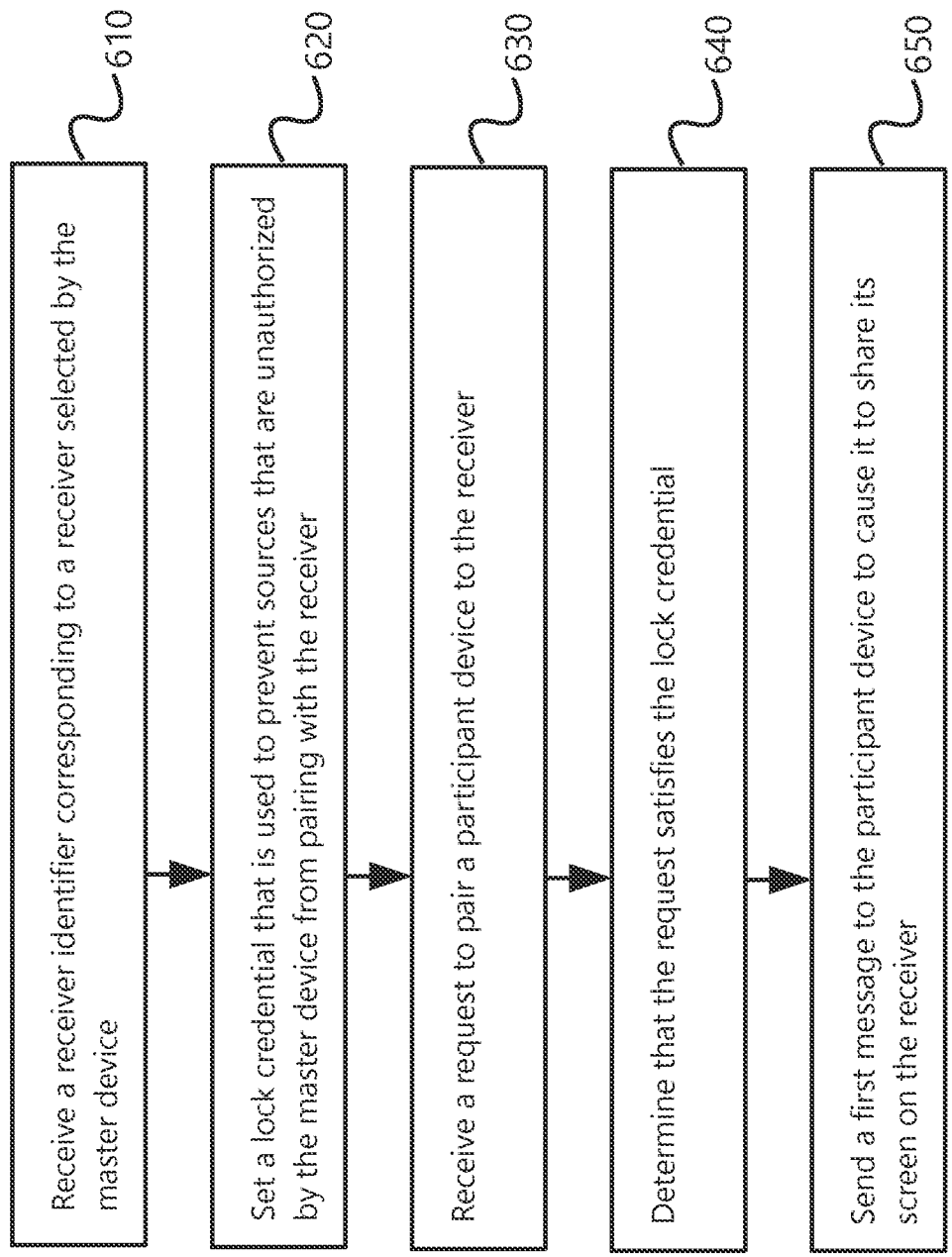
FIG. 6 is an exemplary method performed by a management server.

FIG. 6 is an exemplary flow chart with example steps performed by a management server 138. At step 610, the management server 138 can receive a receiver identifier corresponding to a receiver selected by the master device 138.

At step 620, the management server 138 can set a lock credential that is used to prevent unauthorized sources from controlling the receiver. At step 630, the management server 138 can receive a request to initiate sharing between a participant device and a receiver. At step 640, the management server can determine that the request satisfies the lock credential. This can include determining that the request was sent from a device that is on a whitelist associated with the receiver.

At step 650, the management server can send a first message to the participant device to cause it to share its screen on a receiver. This can include API calls to the participant device. It can also include supplying the participant device with a password for using the receiver.

Figure 7:
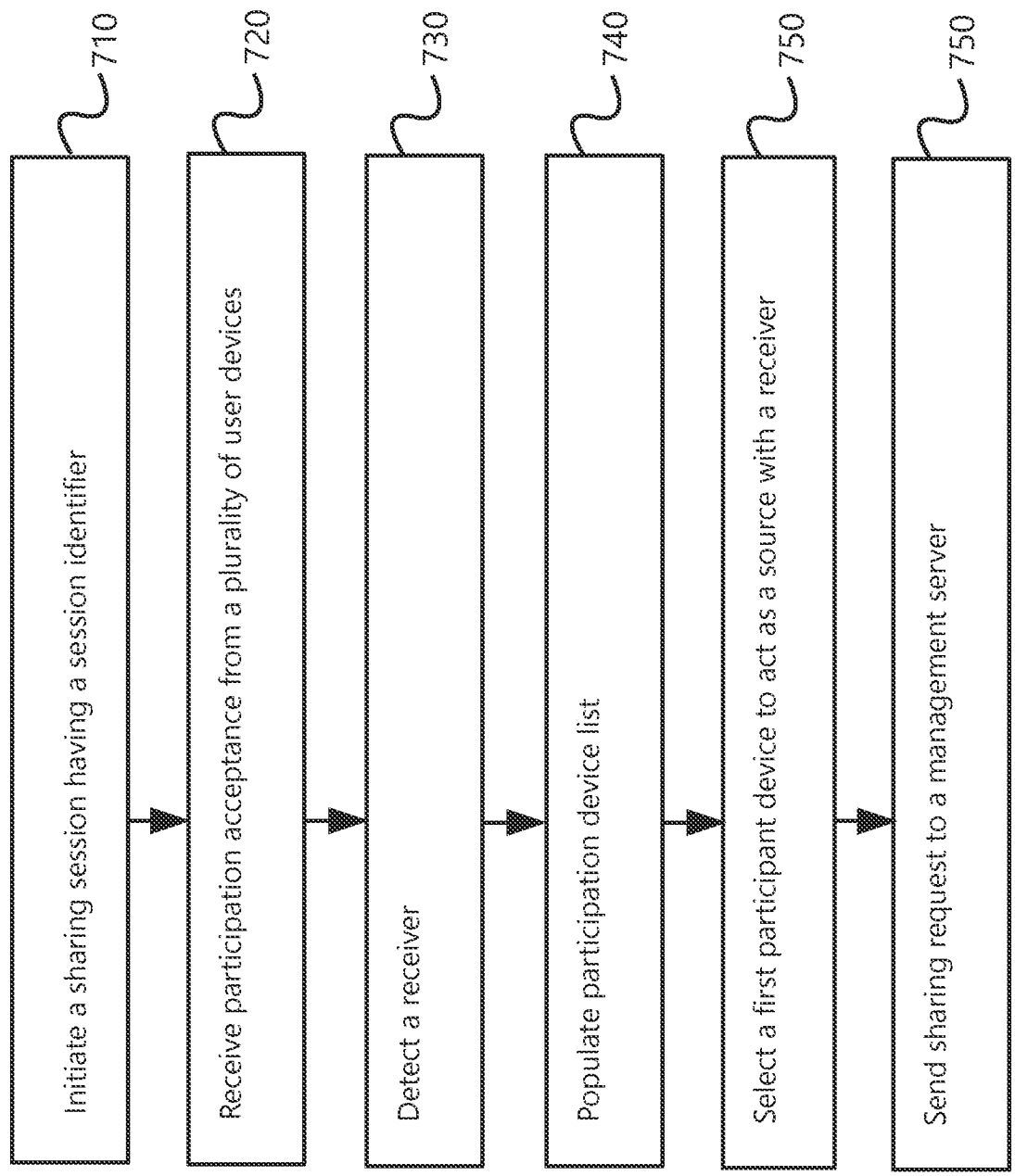
FIG. 7 is an exemplary method performed by a master device.

FIG. 7 is an exemplary flow chart with example steps performed by a master device 110. At step 710, the master device 110 can initiate a sharing session through use of a sharing application. The session can be associated with a session identifier that can be automatically generated or manually entered on the master device 110. The session identifier can be used by other user devices to join the sharing session.

At step 720, the master device 110 can receive participation acceptance from a plurality of user devices. The acceptances can be received over a network that includes peer-to-peer communications and an enterprise network.

At step 730, the master device 110 can detect at least one receiver over the network. This can include detecting the at least one receiver over a peer-to-peer wireless communication. It can also include detecting the receiver on an enterprise network.

At step 740, the master device 110 can populate a participation device list based on which user devices are allowed into the sharing session. In one example, the master device 110 can do the same with a receiver list.

At step 750, the master device 110 can select a first participant device to act as a source to a receiver. This can cause the master device 110 to send a sharing request to the management server 138 at step 760.

Figure 8:
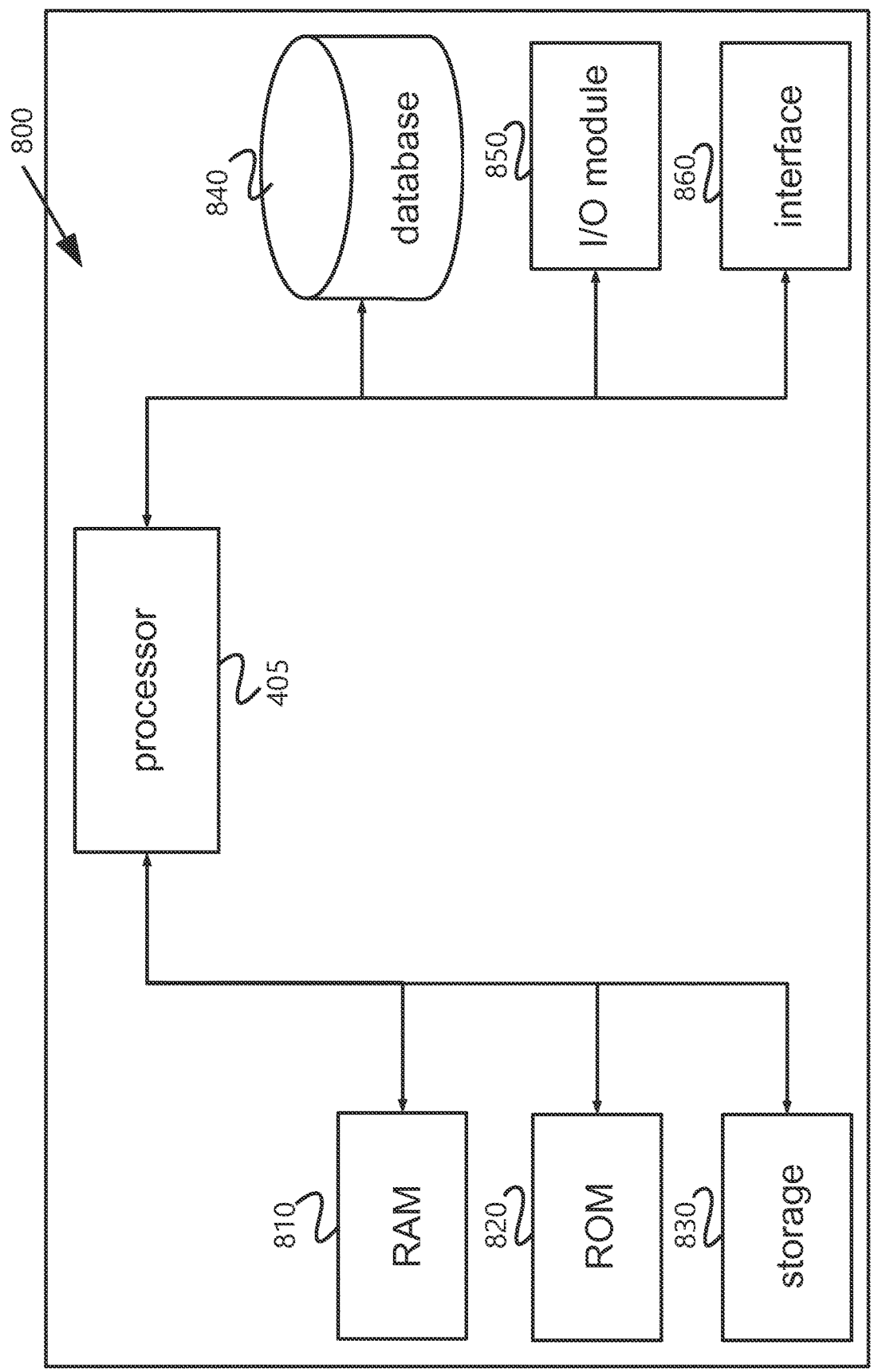
FIG. 8 is an exemplary system.

FIG. 8 depicts an exemplary processor-based computing system 800 representative of the type of computing system that can be present in or used in conjunction with a management server 138, messaging server, or a computing device such as master device 110 or user devices 121 and 122 of FIG. 1. The computing system 800 is exemplary only and does not exclude the possibility of another processor- or controller-based system being used in or with one of the aforementioned components. Additionally, a computing device or system need not include all the system hardware components in an example.

In one aspect, system 800 can include one or more hardware or software components configured to execute software programs, such as software for storing, processing, and analyzing data. For example, system 800 can include one or more hardware components such as, for example, processor 405, a random access memory (RAM) module 810, a read-only memory (ROM) module 820, a storage system 830, a database 840, one or more input/output (I/O) modules 850, and an interface module 860. Alternatively or additionally, system 800 can include one or more software components such as, for example, a computer-readable medium including computer-executable instructions for performing methods consistent with certain disclosed examples. It is contemplated that one or more of the hardware components listed above can be implemented using software. For example, storage 830 can include a software partition associated with one or more other hardware components of system 800. System 800 can include additional, fewer, or different components than those listed above. It is understood that the components listed above are exemplary only and not intended to be limiting.

Processor 405 can include one or more processors, each configured to execute instructions and process data to perform one or more functions associated with system 800. The term "processor," as generally used herein, refers to any logic processing unit, such as one or more central processing units (CPUs), digital signal processors (DSPs), application specific integrated circuits (ASICs), field programmable gate arrays (FPGAs), and similar devices. As illustrated in FIG. 8, processor 405 can be communicatively coupled to RAM 810, ROM 820, storage 830, database 840, I/O module 850, and interface module 860. Processor 805 can be configured to execute sequences of computer program instructions to perform various processes, which will be described in detail below. The computer program instructions can be loaded into RAM for execution by processor 405.

RAM 810 and ROM 820 can each include one or more devices for storing information associated with an operation of system 800 or processor 405. For example, ROM 820 can include a memory device configured to access and store information associated with system 800, including information for identifying, initializing, and monitoring the operation of one or more components and subsystems of system 800. RAM 810 can include a memory device for storing data associated with one or more operations of processor 405. For example, ROM 820 can load instructions into RAM 810 for execution by processor 405.

Storage 830 can include any type of storage device configured to store information that processor 405 can need to perform processes consistent with the disclosed examples.

Database 840 can include one or more software or hardware components that cooperate to store, organize, sort, filter, or arrange data used by system 800 or processor 405. For example, database 840 can include user account information, device settings, and other user preferences or restrictions. Alternatively, database 840 can store additional or different information. Database 840 can also contain a plurality of databases that are communicatively coupled to one another or processor 405, which can be one of a plurality of processors utilized by a server or computing device.

In one example, the database 840 can include one more tables that store a session identifier, a session description, receiver passwords, whitelists of potential source participant devices, and other information including additional lock credential information. I/O module 850 can include one or more components configured to communicate information with a user associated with system 800. For example, I/O module 850 can include a console with an integrated keyboard and mouse to allow a user to input parameters associated with system 800. I/O module 850 can also include a display including a graphical user interface (GUI) for outputting information on a monitor. I/O module 850 can also include peripheral devices such as, for example, a printer for printing information associated with system 800, a user-accessible disk drive (e.g., a USB port, a floppy, CD-ROM, or DVD-ROM drive, etc.) to allow a user to input data stored on a portable media device, a microphone, a speaker system, or any other suitable type of interface device.

Interface 860 can include one or more components configured to transmit and receive data via a communication network, such as the Internet, a local area network, a workstation peer-to-peer network, a direct link network, a wireless network, or any other suitable communication platform. For example, interface 860 can include one or more modulators, demodulators, multiplexers, demultiplexers, network communication devices, wireless devices, antennas, modems, and any other type of device configured to enable data communication via a communication network.

Other examples of the invention will be apparent to those skilled in the art from consideration of the specification and practice of the invention disclosed herein. The terms "orchestrator" and "master" are not meant to limit the examples and are exemplary only. As used herein, a "master" or "orchestrator" can include any user that initiates or manages a sharing session. Example systems can be applied to other environments as well, such as educational environments or religious institutions where multiple presenters may wish to present on one or more screens.

Though some of the described methods have been presented as a series of steps, it should be appreciated that one or more steps can occur simultaneously, in an overlapping fashion, or in a different order. The order of steps presented are only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the invention being indicated by the following claims.

What is claimed is:

1. A system for controlling access in a collaborative screen sharing session, the system comprising:
   an interface in communication with a plurality of user devices, including a master device and a plurality of participant devices selected by the master device;
   a non-transitory, computer-readable medium containing instructions; and
   a processor that executes the instructions to perform stages including:
      receiving, at a management server over a network from the master device, a first request to share a screen of a first participant device on a receiver, the first participant device being authorized to share with the receiver by the master device, wherein the management server, the master device, the first participant device, and the receiver are separate devices from one another;
      setting, at the management server, lock criteria for the receiver that prevents the receiver from accepting a screen sharing request without authorization from the master device;
      sending a first message over the network to the first participant device to begin screen sharing with the receiver;
      receiving a second request to share a screen of a second participant device on the receiver, wherein the second request to share the screen of the second participant device includes a text-based message from the user of the second participant device;
      displaying the second request and the text-based message at the master device;
      determining that the second request complies with the lock criteria; and
      sending a second message to the second participant device to begin screen sharing with the receiver.

2. The system of claim 1, the stages further including rejecting a third request to share a screen of a third device based on determining the third request does not comply with the lock criteria.

3. The system of claim 1, wherein the second request is received from the master device.

4. The system of claim 1, wherein the first participant device and the second participant device communicate with the receiver over a peer-to-peer network.

5. The system of claim 1, the stages further including sending a communication to the receiver to cause the receiver to reject additional media streams while screen sharing is in progress.

6. The system of claim 1, wherein the lock criteria includes a whitelist that identifies at least the master device and the first participant device.

7. The system of claim 1, the stages further including updating the whitelist to include the second participant device as part of the second request.

8. The system of claim 1, wherein the lock criteria includes a password to use with the receiver, and wherein the password is sent to the first participant device as part of the first message.

9. The system of claim 8, the stages further including:
   changing the password in response to the second request; and
   sending the changed password to at least the second participant device.

10. The system of claim 9, the stages further including sending the changed password to the receiver.

11. A non-transitory, computer-readable medium containing instructions executed by a processor to perform stages that control access to a shared screen, the stages comprising:
   receiving, at a management server over a network from a master device, a first request to share a screen of a first participant device on a receiver, the first participant device being authorized to share with the receiver by the master device wherein the management server, the master device, the first participant device, and the receiver are separate devices from one another;
   storing, at the management server, lock criteria for the receiver based on the request, the lock criteria preventing the receiver from accepting a screen sharing request without authorization from the master device;

sending a first message over the network to the first participant device to begin screen sharing with the receiver;

receiving a second request to share a screen of a second participant device on the receiver, wherein the second request to share the screen of the second participant device includes a text-based message from the user of the second participant device;

displaying the second request and the text-based message at the master device;

determining that the second request complies with the lock criteria; and sending a second message to the second participant device to begin screen sharing with the receiver.

12. The non-transitory, computer-readable medium of claim 11, the stages further including rejecting a third request to share a screen of a third device based on determining the third request does not meet the lock criteria.

13. The non-transitory, computer-readable medium of claim 11, wherein the second request is received from the master device.

14. The non-transitory, computer-readable medium of claim 11, wherein the lock criteria includes a whitelist that identifies at least the master device and the first participant device.

15. The non-transitory, computer-readable medium of claim 14, the stages further comprising updating the whitelist, in response to the second request, to include the second participant device.

16. The non-transitory, computer-readable medium of claim 11, wherein the lock criteria includes a password to use the receiver, and wherein the password is sent to the first participant device as part of the first message.

17. A computer-implemented method for controlling access when sharing content, including:

receiving, at a server over a network from a master device, a first request to share a screen of a first participant device on a receiver, the first participant device being authorized to share with the receiver by the master device, wherein the server, the master device, the first participant device, and the receiver are separate devices from one another;

storing, at the server, lock criteria for the receiver based on the request, the lock criteria preventing the receiver from accepting a screen sharing request without authorization from the master device;

sending a first message over the network to the first participant device to begin screen sharing with the receiver;

receiving a second request to share a screen of a second participant device on the receiver, wherein the second request to share the screen of the second participant device includes a text-based message from the user of the second participant device;

displaying the second request and the text-based message at the master device;

determining that the second request complies with the lock criteria; and sending a second message to the second participant device to begin screen sharing with the receiver.

18. The computer-implemented method of claim 17, wherein the second request is received from the master device.

19. The computer-implemented method of claim 17, further including receiving a selection of a plurality of participants and adding the participants to a whitelist of participant devices that are allowed to share their screens with the receiver.

20. The computer-implemented method of claim 17, further including, in response to the second request, sending an updated password to the master device and the receiver.

* * * * *